US012610140B2

(12) United States Patent (10) Patent No.: US 12,610,140 B2
Nagamura et al. (45) Date of Patent: Apr. 21, 2026

(54) SEMICONDUCTOR DEVICE, CORRECTION SUPPORT METHOD, AND SEMICONDUCTOR SYSTEM

(71) Applicant: RENESAS ELECTRONICS CORPORATION, Tokyo (JP)

(72) Inventors: Aritsune Nagamura, Tokyo (JP); Masashi Sakata, Tokyo (JP)

(73) Assignee: Renesas Electronics Corporation, Tokyo (JP)

( * ) Notice: Subject to any disclaimer, the term of this patent is extended or adjusted under 35 U.S.C. 154(b) by 247 days.

(21) Appl. No.: 18/482,937

(22) Filed: Oct. 9, 2023

(65) Prior Publication Data

US 2024/0163556 A1 May 16, 2024

(30) Foreign Application Priority Data

Nov. 16, 2022 (JP) ................................. 2022-183502

(51) Int. Cl.
H04N 23/68 (2023.01)
(52) U.S. Cl.
CPC ....... H04N 23/683 (2023.01); H04N 23/6812 (2023.01)

(58) Field of Classification Search
CPC ............. H04N 23/683; H04N 23/6812; H04N 23/6811; H04N 23/687; H04N 23/60; H04N 23/57
See application file for complete search history.

(56) References Cited

U.S. PATENT DOCUMENTS

2018/0184005 A1 6/2018 Morotomi et al.
2020/0322534 A1* 10/2020 Lee .................... H04N 23/6812

FOREIGN PATENT DOCUMENTS

JP 2018-106051 A 7/2018

* cited by examiner

*Primary Examiner* — Sinh Tran
*Assistant Examiner* — Angel L Garces-Rivera
(74) *Attorney, Agent, or Firm* — Rimon P.C.

(57) ABSTRACT

A semiconductor device is mounted in a terminal provided with an imaging device, an electronic correction unit configured to electronically correct a blur during shooting by using image data captured by the imaging device, a motion detection sensor, and a memory unit, and the semiconductor device includes an arithmetic operation unit configured to perform predetermined arithmetic processing on detection data acquired from the motion detection sensor and a storing unit configured to store a result of the arithmetic processing as correction information for the correction by the electronic correction unit in the memory unit.

6 Claims, 8 Drawing Sheets

*FIG. 5*

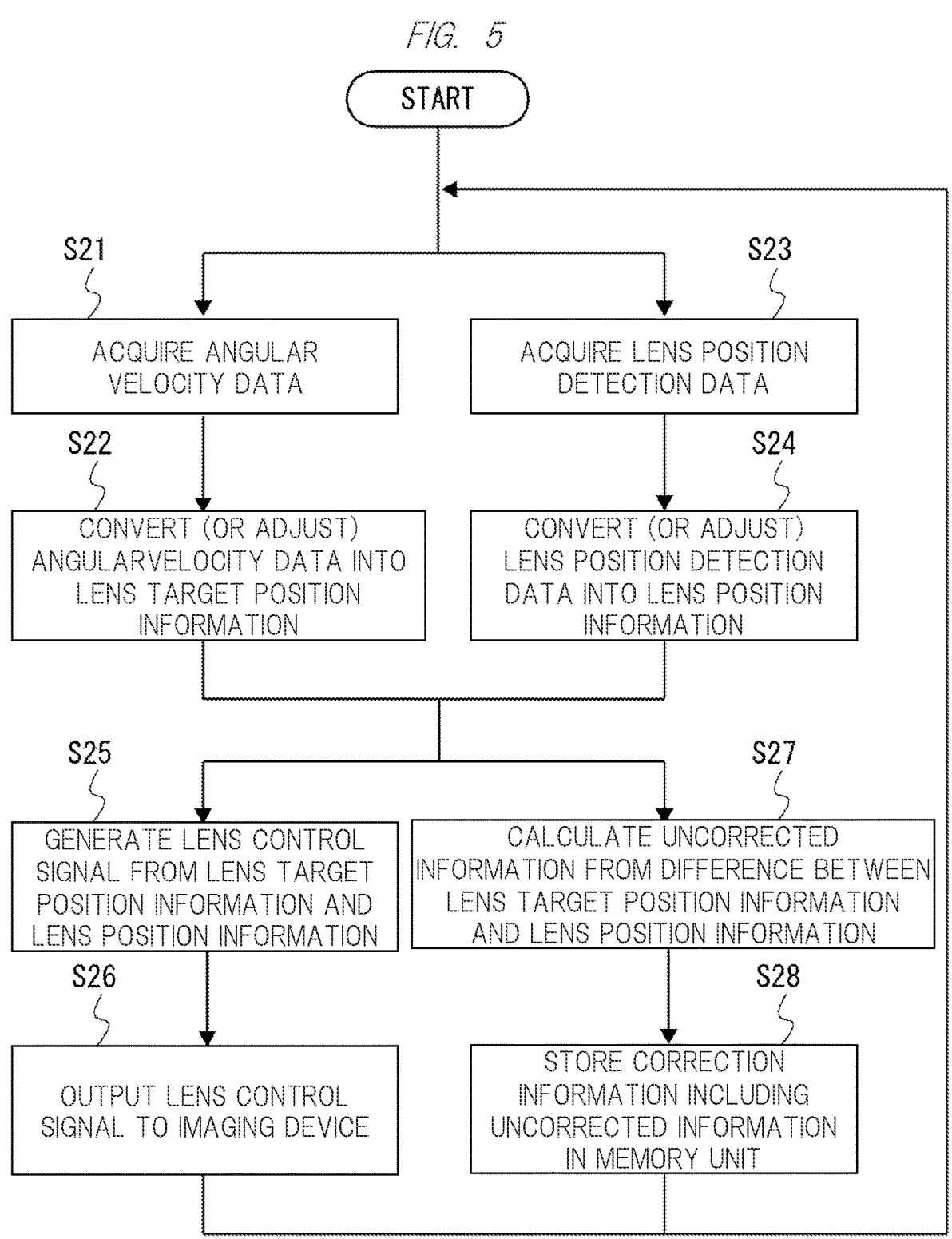

START

S21
ACQUIRE ANGULAR VELOCITY DATA

S23
ACQUIRE LENS POSITION DETECTION DATA

S22
CONVERT (OR ADJUST) ANGULARVELOCITY DATA INTO LENS TARGET POSITION INFORMATION

S24
CONVERT (OR ADJUST) LENS POSITION DETECTION DATA INTO LENS POSITION INFORMATION

S25
GENERATE LENS CONTROL SIGNAL FROM LENS TARGET POSITION INFORMATION AND LENS POSITION INFORMATION

S27
CALCULATE UNCORRECTED INFORMATION FROM DIFFERENCE BETWEEN LENS TARGET POSITION INFORMATION AND LENS POSITION INFORMATION

S26
OUTPUT LENS CONTROL SIGNAL TO IMAGING DEVICE

S28
STORE CORRECTION INFORMATION INCLUDING UNCORRECTED INFORMATION IN MEMORY UNIT

SEMICONDUCTOR DEVICE, CORRECTION SUPPORT METHOD, AND SEMICONDUCTOR SYSTEM

CROSS-REFERENCE TO RELATED APPLICATIONS

The disclosure of Japanese Patent Application No. 2022-183502 filed on Nov. 16, 2022 including the specification, drawings and abstract is incorporated herein by reference in its entirety.

BACKGROUND

The present disclosure relates to a semiconductor device, a correction support method, and a semiconductor system.

There are the optical image stabilization (OIS) and the electronic image stabilization (EIS) as blur correction methods during shooting with camera modules installed in mobile terminals.

There is disclosed a technique listed below.
[Patent Document 1] Japanese Unexamined Patent Application Publication No. 2018-106051

Patent Document 1 discloses a technique related to the optical image stabilization. The camera module according to Patent Document 1 controls the position of the correction lens by using the optical blur correction amount, the tilt correction amount in the tilt of the camera module, and the like such that the correction lens shifts within a plane perpendicular to the optical axis.

Also, in the electronic image stabilization, the image data is electronically corrected by using image data captured by the camera.

SUMMARY

Here, the improvement in correction accuracy by the electronic image stabilization has been demanded.

Other problems and novel features will be apparent from the description of this specification and the accompanying drawings.

According to an embodiment, the result of predetermined arithmetic processing on detection data in which motion of an imaging device is detected is provided as correction information for electronic image stabilization.

According to the embodiment, the correction accuracy by the electronic image stabilization can be improved.

BRIEF DESCRIPTION OF THE DRAWINGS

FIG. 5 is a flowchart showing the flow of a correction support process in the optical correction unit according to the second embodiment.

DETAILED DESCRIPTION

Figure 1:
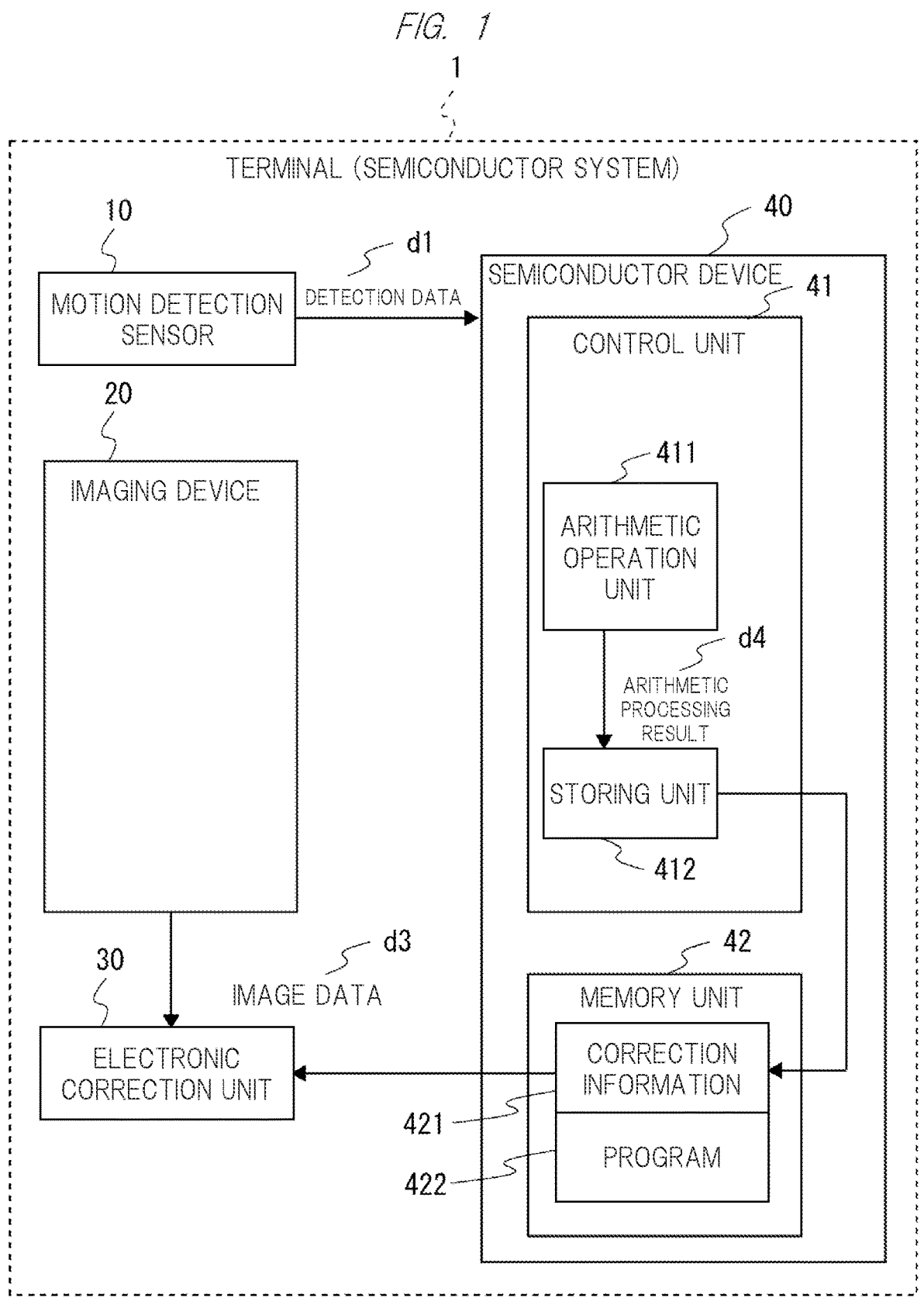
FIG. 1 is a block diagram showing an overall configuration of a terminal in which a semiconductor device according to the first embodiment is mounted.

For clearer understanding of the invention, the following descriptions and drawings are omitted and simplified as appropriate. Further, elements described in the drawings as functional blocks that perform various processes can be configured with a CPU (Central Processing Unit), memory, and other circuits in terms of hardware, and are implemented by a program or the like loaded in the memory in terms of software. Therefore, those skilled in the art will understand that these functional blocks can be implemented in various forms by hardware only, software only, or a combination thereof, and are not limited to any of them. In each drawing, the same elements are denoted by the same reference characters, and redundant description is omitted as necessary.

Also, the above-described program can be stored by using various types of non-transitory computer readable media and supplied to the computer. The non-transitory computer readable media include various types of tangible storage media. Examples of the non-transitory computer readable media include a magnetic recording medium (for example, flexible disc, magnetic tape, hard disk drive), a magneto-optical recording medium (for example, magneto-optical disc), a CD-ROM (Read Only Memory), a CD-R, a CD-R/W, and a semiconductor memory (for example, mask ROM, PROM (Programmable ROM), EPROM (Erasable PROM), flash ROM, RAM (Random Access Memory)). Further, the program may be supplied to the computer by various types of transitory computer readable media. Examples of the transitory computer readable media include electrical signals, optical signals, and electromagnetic waves. The transitory computer readable media can supply the program to the computer via wired communication paths such as wires and optical fibers or wireless communication paths.

First Embodiment

FIG. 1 is a block diagram showing an overall configuration of a terminal 1 in which a semiconductor device 40 according to the first embodiment is mounted. The terminal 1 is a portable information processing terminal equipped with an imaging device 20, and can be referred to also as a semiconductor system. The terminal 1 is, for example, a smartphone, a digital camera, or the like. The terminal 1 includes a motion detection sensor 10, the imaging device 20, an electronic correction unit 30, and the semiconductor device 40 including a control unit 41 and a memory unit 42.

The motion detection sensor 10 detects motions of the imaging device 20 such as vibration, rotation, and tilt, measures an angular velocity in the vibration and rotation, an acceleration associated with the tilt, and the like, and outputs at least a part of the angular velocity, acceleration, and the like as detection data d1 to the semiconductor device 40. The motion detection sensor 10 is referred to also as an inertial sensor, and may include a gyro sensor that is a vibration detection sensor, an acceleration sensor that is a tilt detection sensor, and the like.

The imaging device 20 is referred to also as an optical system or a camera module. The imaging device 20 outputs captured image data d3 to the electronic correction unit 30.

The electronic correction unit 30 electronically corrects the motion blur (jitter, hand shake) during shooting by using the image data d3 captured by the imaging device 20. The electronic correction unit 30 according to the present embodiment acquires later-described correction information 421 from the memory unit 42 in the semiconductor device 40 and electronically corrects the image data d3 by using the correction information 421. Note that the electronic correction unit 30 is implemented by a control device, a memory, and an electronic correction program in the semiconductor device or the information processing device. Namely, the control device implements the function of the electronic correction unit 30 by reading a program for electronic correction into the memory and executing the program.

The semiconductor device 40 includes at least the control unit 41 and the memory unit 42. Although the semiconductor device 40 has other general configurations, illustration and description thereof are omitted. The memory unit 42 is implemented by a storage element such as a memory. The memory unit 42 stores the correction information 421 and a program 422. The correction information 421 is information used for electronic correction by the electronic correction unit 30 for the motion blur that occurs during the shooting with the imaging device 20. The program 422 is a computer program that implements the processing of the correction support method according to the present embodiment.

The control unit 41 is a control device such as a CPU. The control unit 41 implements the functions of an arithmetic operation unit 411, the storing unit 412, and the like by executing the program 422. The arithmetic operation unit 411 performs predetermined arithmetic processing on the detection data d1 acquired from the motion detection sensor 10. The predetermined arithmetic processing includes, for example, integration operation on the detection data d1, that is, conversion processing from angular velocity data to angle data, calculation of a difference from other detection data, and the like. However, the predetermined arithmetic processing is not limited to these. The storing unit 412 stores the result of arithmetic processing by the arithmetic operation unit 411 in the memory unit 42 as the correction information 421 for the correction by the electronic correction unit 30.

Figure 2:
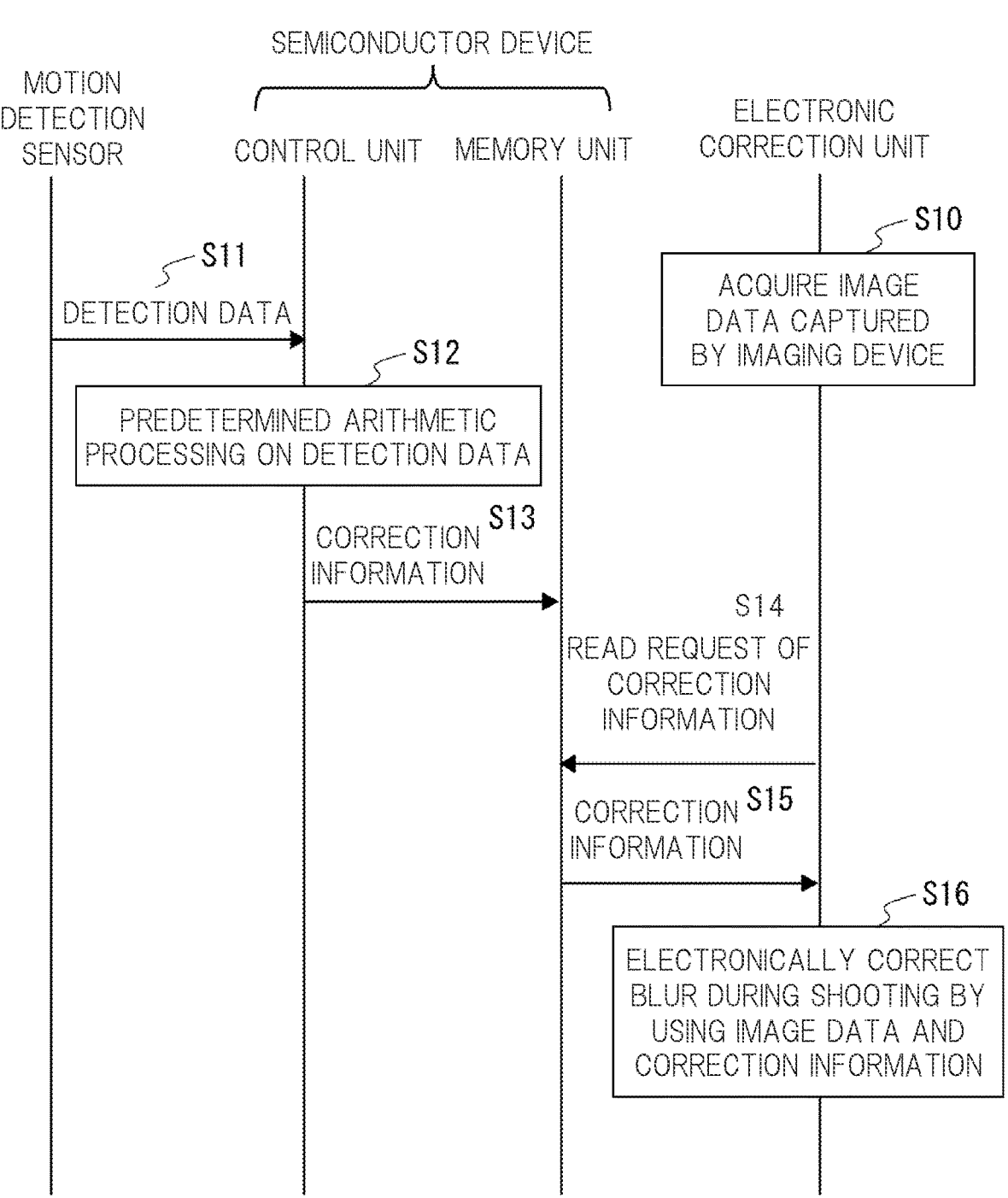
FIG. 2 is a sequence diagram showing the flow of a correction support method according to the first embodiment.

FIG. 2 is a sequence diagram showing the flow of the correction support method according to the first embodiment. As a premise, the user who carries the terminal 1 takes an image by using the imaging device 20. In response to this, the electronic correction unit 30 acquires the image data d3 captured by the imaging device 20 (S10). Also, the motion detection sensor 10 detects the motion of the imaging device 20 and outputs it to the semiconductor device 40 as the detection data d1. In response to this, the control unit 41 of the semiconductor device 40 acquires the detection data d1 from the motion detection sensor 10 (S11). Note that the electronic correction unit 30 may output an instruction of arithmetic processing of correction information to the semiconductor device 40 at a predetermined timing.

Next, the arithmetic operation unit 411 of the control unit 41 performs predetermined arithmetic processing on the detection data d1 (S12), and outputs an arithmetic processing result d4 to the storing unit 412. Then, the storing unit 412 stores the arithmetic processing result d4 in the memory unit 42 as the correction information 421 (S13). Namely, the arithmetic processing result d4 is stored in the memory unit 42 as the correction information 421.

Thereafter, the electronic correction unit 30 transmits a read request of the correction information 421 to the memory unit 42 (S14). In response to this, the electronic correction unit 30 reads the correction information 421 from the memory unit 42 (S15). Note that the electronic correction unit 30 may directly read the correction information 421 from the memory unit 42 without transmitting the read request in step S14. Then, the electronic correction unit 30 electronically corrects the blur during shooting by using the image data d3 and the correction information 421 (S16).

As described above, in the present embodiment, the result of the predetermined arithmetic processing on the detection data d1 in which the motion of the imaging device 20 is detected is provided as the correction information for electronic blur correction. Therefore, the correction using data that cannot be acquired by the electronic blur correction alone can be performed, and thus the correction accuracy by the electronic blur correction can be improved.

Second Embodiment

Here, the supplementary description about the technique related to the present embodiment will be given. As described above, there are the optical image stabilization (OIS) and the electronic image stabilization (EIS) as blur correction methods during shooting with camera modules. The OIS is a technique for correcting the motion blur by acquiring information such as the direction and magnitude of motion blur from the data obtained from the motion detection sensor, calculating target position information for moving the lens necessary to correct the motion blur from this information, and controlling the lens position such that the lens position detected by the lens position sensor or the like in the imaging device matches the target position information. Note that the lens position may be detected by means other than the lens position sensor. Further, in recent years, there are various methods such as a method of moving the camera module body and a method of correcting motion blur by moving the camera image sensor other than the method of performing correction by moving the lens. The technique according to the present disclosure is applicable to all these methods. The EIS is a technique for electronically correcting the motion blur by performing the shooting while making the effective pixel region narrower than the imaging region of the imaging device, calculating the motion amount within the imaging region by comparing the image region captured earlier and the image region captured later, and adjusting the effective pixel region of the imaging device according to the calculated motion amount. However, in the EIS, since the effective pixel region of the image sensor is only partly used, the capability of the image sensor cannot be fully utilized.

Initially, the OIS and the EIS were techniques that were operated independently, but there has been a demand for cooperation between the OIS and the EIS in order to improve the correction accuracy. For example, it is conceivable to provide data acquired or calculated on the OIS side to the EIS side via a memory. The data provided from the OIS side include, for example, the detection data itself acquired by the OIS (for example, gyro RAW data of gyro sensor), the lens target position information converted from the detection data, and the lens position information detected by the imaging device. However, these provided data cannot be used for the correction of the EIS as they are, and processing on the EIS side, that is, some arithmetic processing is required. Also, in order to improve the correction accuracy on the EIS side, the types of provided data need to be increased. For example, detection data, lens target position information, lens position information, and the like are all stored in the memory on the OIS side. In this way, it becomes possible to acquire the provided data on the EIS side via the memory. However, the transfer amount and the communication load may increase. In addition, data transfer from the OIS to the EIS must be performed in real time during image capturing, and other processes may be affected if the transfer amount becomes large. Therefore, there is a demand for a technique for improving the correction accuracy of the EIS by cooperation while suppressing the amount of data transferred from the OIS side to the EIS side. Based on the above, the present embodiment for solving at least one of these problems will be described below.

Figure 3:
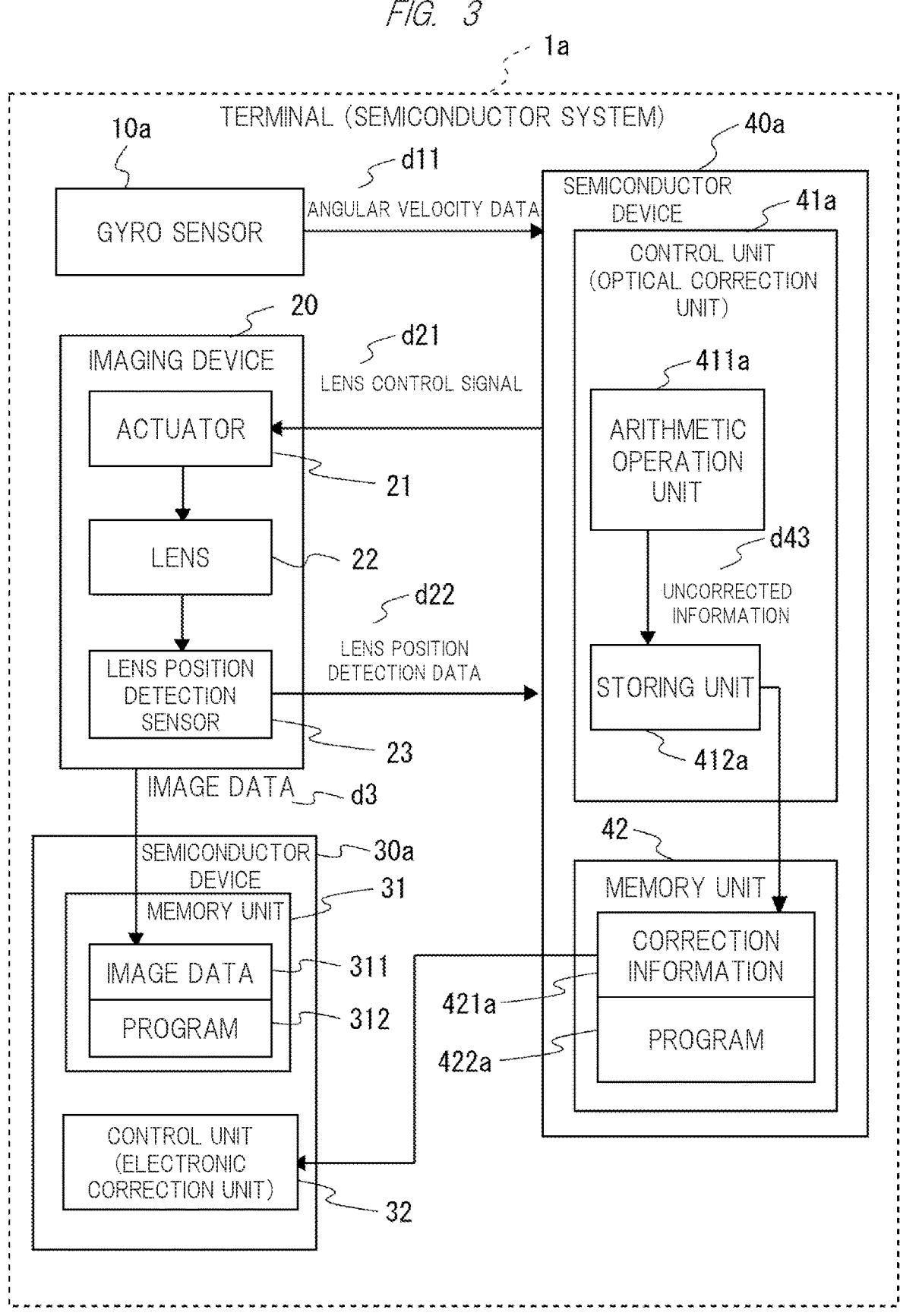
FIG. 3 is a block diagram showing a configuration of a terminal in which a semiconductor device according to the second embodiment is mounted.

FIG. 3 is a block diagram showing a configuration of a terminal 1a equipped with a semiconductor device 40a according to the second embodiment. The terminal 1a is a modification of the terminal 1 described above, and is an example of a semiconductor system. The terminal 1a includes at least a gyro sensor 10a, the imaging device 20, and semiconductor devices 30a and 40a.

The gyro sensor 10a is an example of the motion detection sensor 10 described above. The gyro sensor 10a measures the rotational angular velocity of the imaging device 20 and outputs it as angular velocity data d11 to the semiconductor device 40a. Note that the terminal 1a may further include a motion detection sensor other than the gyro sensor 10a such as an acceleration sensor as a configuration not shown.

The imaging device 20 outputs the captured image data d3 to the semiconductor device 30a as in the first embodiment. The imaging device 20 has an actuator 21, a lens 22, and a lens position detection sensor 23 as a specific configuration. Although the lens position detection sensor 23 may be provided in the actuator 21, it is described as a separate configuration for convenience of description. The actuator 21 controls the position of the lens 22 according to a lens control signal d21 received from the semiconductor device 40a. Note that the lens control signal d21 may indicate a voltage or current for driving the actuator 21. For example, the actuator 21 may shift the lens 22 in accordance with the change in voltage. The lens position detection sensor 23 detects the position of the lens 22 controlled by the actuator 21, and outputs lens position detection data d22 to the semiconductor device 40a. Note that the imaging device 20 does not have to include the lens position detection sensor 23. For example, the imaging device 20 may virtually calculate the lens position by measuring the current value flowing through the lens driving wire in the actuator 21 without using the independent lens position detection sensor 23 and output it to the semiconductor device 40a as the lens position detection data d22. Specifically, the imaging device 20 may apply an electric current to shape memory alloy as the lens driving wire and control the position of the lens by the expansion and contraction of the shape memory alloy.

The semiconductor device 30a is an example of a configuration that implements the function of the EIS. The semiconductor device 30a includes at least a memory unit 31 and a control unit (electronic correction unit) 32. Although the semiconductor device 30a has other general configurations, illustration and description thereof are omitted. The memory unit 31 is implemented by a storage element such as a memory. The memory unit 31 stores image data 311 and a program 312. The image data 311 is the image data d3 captured by the imaging device 20 and stored in the memory unit 31. The program 312 is a computer program that implements the processing of the EIS according to the present embodiment. Namely, the program 312 implements the processing of electronic correction using correction information 421a in addition to the normal processing of the EIS. The control unit 32 is a control device such as a CPU. The control unit 32 implements the processing of the EIS according to the present embodiment by executing the program 312.

The semiconductor device 40a is a modification of the semiconductor device 40 described above, and is an example of a configuration that implements the function of the OIS. Therefore, the semiconductor device 40a according to the present embodiment performs the correction support process according to the first embodiment described above as well as the normal processing of the OIS. The semiconductor device 40a includes at least a control unit (optical correction unit) 41a and the memory unit 42. The memory unit 42 stores the correction information 421a and a program 422a. The correction information 421a includes at least uncorrected information d43 described later. Therefore, the correction information 421a may be the uncorrected information d43 itself. The program 422a is a computer program that implements the processing of the correction support method according to the present embodiment.

The control unit 41a implements the functions of an arithmetic operation unit 411a, a storing unit 412a, and the like by executing the program 422a. The arithmetic operation unit 411a performs predetermined arithmetic processing on the angular velocity data d11 acquired from the gyro sensor 10a and the lens position detection data d22 acquired from the lens position detection sensor 23. The arithmetic operation unit 411a derives the lens control signal d21 and the uncorrected information d43 as the result of arithmetic processing. The predetermined arithmetic processing may include existing processing of the OIS. The arithmetic operation unit 411a outputs the lens control signal d21 to the actuator 21. Further, the arithmetic operation unit 411a outputs the correction information 421a including the uncorrected information d43 to the storing unit 412a. The storing unit 412a stores at least the uncorrected information d43 in the memory unit 42 as the correction information 421a. Note that the storing unit 412a may include, in the correction information 421a, arithmetic processing results other than the uncorrected information d43, detection data, or the like. Further, the internal configuration and detailed processing of the control unit 41a will be described later.

Figure 4:
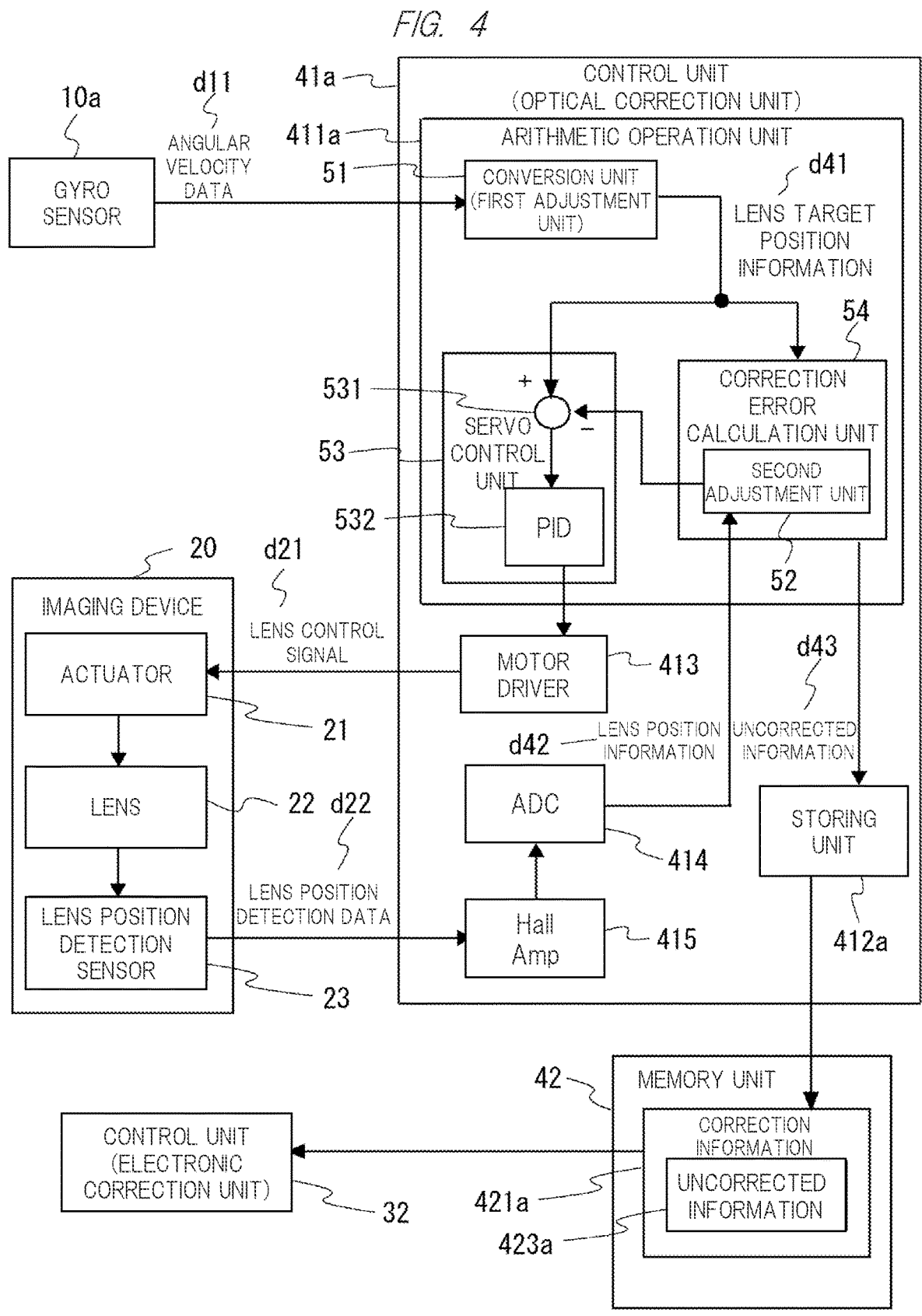
FIG. 4 is a block diagram for describing the relationship between an internal configuration and a peripheral configuration of a control unit (optical correction unit) according to the second embodiment.

FIG. 4 is a block diagram for describing the relationship between an internal configuration and a peripheral configuration of the control unit (optical correction unit) 41a according to the second embodiment. The control unit 41a includes a motor driver 413, an ADC 414, and a Hall amplifier 415 in addition to the arithmetic operation unit 411a and the storing unit 412a. The arithmetic operation unit 411a includes a conversion unit (first adjustment unit) 51, a servo control unit 53, and a correction error calculation unit 54 (including a second adjustment unit 52). Note that it is possible to use known ones as the motor driver 413, the ADC 414, the Hall amplifier 415, and the servo control unit 53. The conversion unit 51 integrates the angular velocity data d11 acquired from the gyro sensor 10a once to convert it into an angle, converts the angle into the lens target position information d41, and outputs the lens target position information d41 to the servo control unit 53 and the correction error calculation unit 54. Here, the conversion unit 51 may perform at least a part of scale adjustment, offset adjustment, and polarity adjustment when converting the angular velocity data d11 into the lens target position information d41. For example, the conversion unit 51 performs adjustment for matching the scales of the lens target position information d41 and lens position information d42 described later. Further, the conversion unit 51 adjusts the lens target position information d41 by using an offset as an adjustment value based on the individual value of the gyro sensor 10a. Also, when the polarity change is necessary due to the mounting direction of the gyro sensor 10a and the mounting direction of the imaging device 20, the conversion unit 51 changes the polarity at the time of conversion.

The servo control unit 53 includes an addition/subtraction unit 531 and a PID (Proportional Integral Differential) 532. The addition/subtraction unit 531 calculates the difference in position information between the lens target position information d41 and the lens position information d42 (after adjustment by the second adjustment unit 52), and outputs the difference to the PID 532. The PID 532 performs processing such as proportionality, integration, and differentiation on the output result of the addition/subtraction unit 531, calculates the correction amount of the position of the lens 22, and outputs it to the motor driver 413. The servo control unit 53 performs the so-called servo control such that the difference between the lens target position information d41 and the lens position information d42 approaches zero.

The motor driver 413 converts the output result of the PID 532 into the lens control signal d21 for moving the position of the lens 22, and outputs the lens control signal d21 to the actuator 21. Note that "conversion into the lens control signal d21 and output thereof" means that the motor driver 413 controls the voltage (or current) for driving the actuator 21. For example, the motor driver 413 increases the voltage when moving the actuator 21 largely, and controls the voltage in the opposite direction when moving the actuator 21 in the opposite direction. Also, the motor driver 413 can be said to control the lens 22 in an analog manner by converting the output (digital) signal from the servo control unit 53 into an analog signal (voltage or current).

The Hall amplifier 415 acquires the lens position detection data d22 detected by the lens position detection sensor 23 and outputs it to the ADC 414 after amplifying it. The ADC 414 converts the lens position detection data d22 from an analog signal to a digital signal, and outputs it to the second adjustment unit 52 as the lens position information d42. Note that the ADC 414 may directly output the lens position information d42 to the addition/subtraction unit 531 without going through the second adjustment unit 52.

The second adjustment unit 52 included in the correction error calculation unit 54 performs at least a part of scale adjustment, offset adjustment, and polarity adjustment on the lens position information d42 output from the ADC 414, and outputs the lens position information d42 after the adjustment to the addition/subtraction unit 531. Also, the second adjustment unit 52 may perform non-linear correction caused by the hardware of the imaging device 20. Note that the lens position information d42 does not always have to be adjusted or the like by the second adjuster 52.

The correction error calculation unit 54 calculates the difference in coordinates between the lens target position information d41 and the lens position information d42. Note that the correction error calculation unit 54 may calculate the difference by using the lens position information d42 that has been adjusted by the second adjustment unit 52 or may calculate the difference by using the lens position information d42 that has not been adjusted by the second adjustment unit 52. For example, the correction error calculation unit 54 calculates the differences in coordinates for each of a plurality of time stamps within a certain period of time, and sets a set of differences as the uncorrected information d43. Then, the correction error calculation unit 54 outputs the uncorrected information d43 to the storing unit 412a. Here, the uncorrected information d43 indicates information in which motion blur cannot be completely corrected by the optical correction based on the lens control signal d21. In other words, the uncorrected information d43 can be said to be the amount (correction error) of insufficient correction by the OIS. Namely, the EIS can perform electronic correction on the portion that has not been corrected by the OIS by using the uncorrected information, thereby improving the correction accuracy of the EIS. Also, the control unit (electronic correction unit) 32 can use the uncorrected information d43 as it is as a reference for the electronic correction. Further, it can be said that the correction error calculation unit 54 performs the processing of calculating the uncorrected information d43 indicating the information in which the blur has not been optically corrected completely based on the detection data, as arithmetic processing. Namely, since the data provided from the OIS side has already been processed on the OIS side, the provided data can be used for electronic correction as correction information without the need for correction processing on the EIS side. Therefore, the correction accuracy can be improved while suppressing the processing load on the EIS side. Note that the correction error calculation unit 54 is not limited to collectively calculating and outputting a set of differences within a certain period of time described above. For example, the correction error calculation unit 54 may calculate and output the difference in position information corresponding to one time stamp in real time, or calculate the difference in position information in real time and collectively output a set of a plurality of differences.

The storing unit 412a stores the correction information 421a including the uncorrected information d43 (423a) in the memory unit 42. As described above, the storing unit 412a may sequentially store the differences calculated in real time in the memory unit 42 as the uncorrected information d43. The configuration of the control unit 41a other than the correction error calculation unit 54 and the storing unit 412a may be implemented by using the configuration of the existing function of the OIS.

Next, the process flow of the correction support method according to the second embodiment will be described. Note that description of the same process as in FIG. 2 described above will be omitted as appropriate. As a premise, the user who carries the terminal 1a takes an image by using the imaging device 20. In response to this, the semiconductor device 30a acquires the image data d3 captured by the imaging device 20 and stores it in the memory unit 31 as the image data 311. Also, the semiconductor device 30a may output an instruction of arithmetic processing of correction information to the semiconductor device 40a.

Next, the gyro sensor 10a detects the motion of the imaging device 20 and outputs it as the angular velocity data d11 to the semiconductor device 40a. Further, the lens position detection sensor 23 detects the position of the lens 22 and outputs it as the lens position detection data d22 to the semiconductor device 40a. In response to these, the semiconductor device 40a starts the correction support process.

FIG. 5 is a flowchart showing the flow of the correction support process in the control unit (optical correction unit) 41a according to the second embodiment. First, the conversion unit 51 acquires the angular velocity data d11 from the gyro sensor 10a (S21). Next, the conversion unit 51 converts (and adjusts) the angular velocity data d11 into the lens target position information d41 as described above (S22).

Also, the Hall amplifier 415 acquires the lens position detection data d22 from the lens position detection sensor 23 (S23). Then, the Hall amplifier 415, the ADC 414, and the second adjustment unit 52 convert (and adjust) the lens position detection data d22 into the lens position information d42 as described above (S24). For convenience of description, FIG. 5 shows the process of steps S21 and S22 and the process of steps S23 and S24 in parallel. However, depending on the execution environment, the processing speed of steps S23 and S24 may be faster than that of steps S21 and S22. In that case, the process of S23 and S24 may be executed multiple times per one process of S21 and S22.

After steps S22 and S24, the servo control unit 53 and the motor driver 413 generate the lens control signal d21 from the lens target position information d41 and the lens position information d42 as described above (S25), and outputs the lens control signal d21 to the imaging device 20 (S26). For convenience of description, FIG. 5 shows the process of steps S25 and S26 and the process of steps S27 and S28 described later in parallel. However, depending on the execution environment, the processing speed of steps S25 and S26 may be faster than that of steps S27 and S28 (and S23 and S24). In that case, the process of S25 and S26 may be executed multiple times per one process of S27 and S28 (and S23 and S24).

Figure 6:
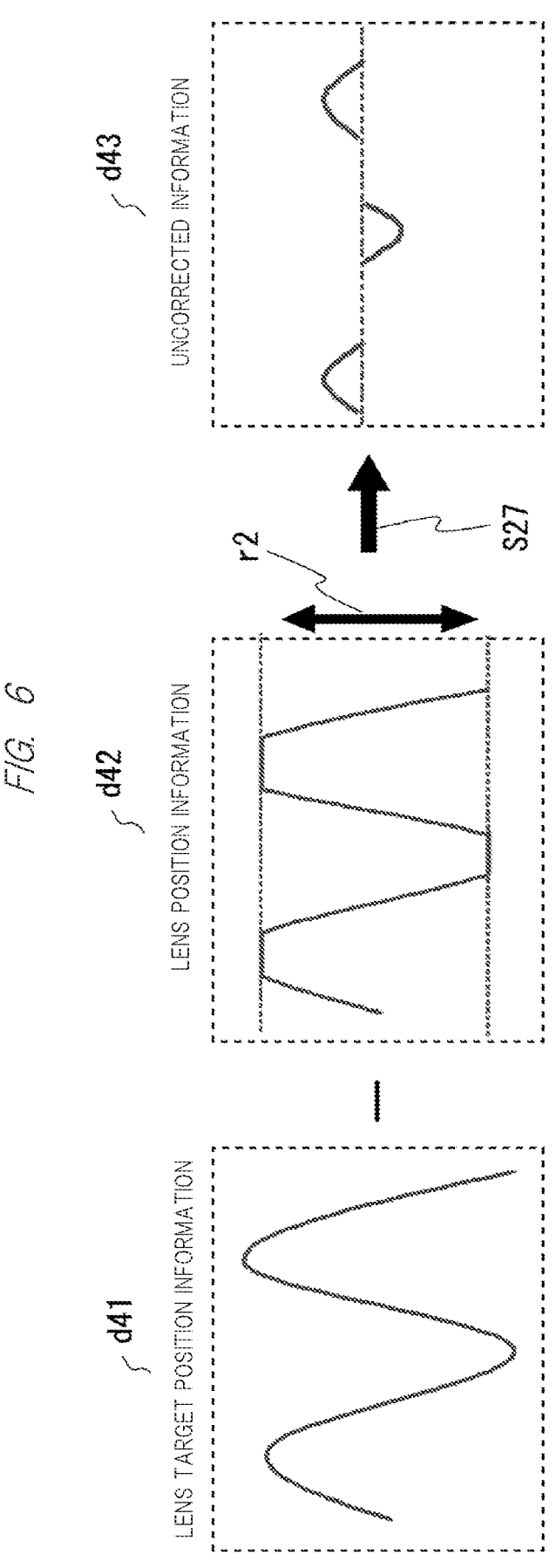
FIG. 6 is a diagram for describing a concept of uncorrected information according to the second embodiment.

After steps S22 and S24, the correction error calculation unit 54 calculates the uncorrected information d43 from the difference between the lens target position information d41 and the lens position information d42 (S27). Note that the correction error calculation unit 54 may acquire the uncorrected information d43 by sequentially calculating the difference between the lens target position information d41 and the lens position information d42 corresponding to one time stamp. FIG. 6 is a diagram for describing a concept of uncorrected information according to the second embodiment. Namely, the correction error calculation unit 54 calculates the difference between the set of time-series coordinates of the lens target position and the set of time-series coordinates of the lens position. Specifically, for example, the correction error calculation unit 54 calculates the difference in coordinates by comparing the coordinates of the corresponding time stamp between the lens target position information d41 and the lens position information d42. Here, a movable range r2 of the lens in the lens position information d42 is a range that can be corrected by the OIS, and is, for example, about 1 degree to 3 degrees. Therefore, a waveform exceeding the movable range r2 of the lens does not appear in the waveform of the lens position information d42. Thus, the correction error calculation unit 54 can calculate, as a difference, a set of coordinates exceeding the movable range r2 of the lens in the lens target position information d41. Then, the correction error calculation unit 54 sets the set of coordinates of the calculated difference as the uncorrected information d43. Note that the uncorrected information d43 can be referred to also as correction error information.

After step S27, the storing unit 412a stores the correction information 421a including the uncorrected information d43 in the memory unit 42 (S28). When the uncorrected information d43 is sequentially calculated for each time stamp in step S27, the storing unit 412a may similarly sequentially store the correction information 421a including the uncorrected information d43 in the memory unit 42. Alternatively, the storing unit 412a may collectively store a set of the uncorrected information d43 for a certain period of time (predetermined number of times) in the memory unit 42. Thereafter, the control unit (electronic correction unit) 32 acquires the uncorrected information 423a included in the correction information 421a from the memory unit 42 as described above, and performs the electronic correction on the image data d3 by using the uncorrected information 423a. The control unit (electronic correction unit) 32 may acquire the correction information 421a from the memory unit 42 in synchronization with or out of synchronization with the storing timing of the correction information 421a in the memory unit 42 by the storing unit 412a. Namely, the update frequency of the correction information 421a in the OIS and the acquisition frequency (data transfer frequency) of the correction information 421a in the EIS may or may not match. For example, the storing unit 412a may update the correction information 421a in the memory unit 42 at a frequency of 1 kHz, and the control unit (electronic correction unit) 32 may acquire the correction information 421a from the memory unit 42 at a frequency of 1 kHz. Alternatively, the storing unit 412a may update the correction information 421a in the memory unit 42 at a frequency of 1 kHz, and the control unit (electronic correction unit) 32 may acquire the correction information 421a from the memory unit 42 at a frequency of 500 kHz.

After steps S26 and S28, the flow returns to steps S21 and S23, and the semiconductor device 40a continues the correction support process. The semiconductor device 40a may end the correction support process when receiving an instruction to stop arithmetic processing of the correction information from the semiconductor device 30a.

Note that data communication between the semiconductor devices 40a and 30a may be performed via a digital interface such as the IIC (Inter-Integrated Circuit). Moreover, the semiconductor device 40a may start, execute, and end the correction support process periodically or at a predetermined timing regardless of the instruction of arithmetic processing from the semiconductor device 30a. Alternatively, the semiconductor device 40a may perform arithmetic processing and storing process of the correction information to the memory unit 42 by receiving a synchronization signal from the lens position detection sensor 23 of the imaging device 20 or the like. Alternatively, the semiconductor device 40a may perform arithmetic processing and storing process of the correction information to the memory unit 42 by receiving an instruction to store the correction information in the memory unit 42 from the semiconductor device 30a.

Further, as described above, the arithmetic operation unit 411a including the first adjustment unit (51) and the second adjustment unit 52 performs the arithmetic processing by adjusting the detection data based on at least one of the states of the imaging device and the motion detection sensor. As a result, electronic correction can be performed on the EIS side without considering the differences in scale, offset, polarity, and the like, so that the processing load on the EIS side can be reduced and the correction speed can be improved.

Further, the arithmetic operation unit 411a according to the present embodiment performs the arithmetic processing in parallel with the optical correction process for motion blur. Therefore, the waiting time for electronic correction can be reduced, and the optical correction and the electronic correction can be cooperated efficiently and effectively.

Note that the predetermined arithmetic processing performed by the arithmetic operation unit 411a is a part of the technique of the optical image stabilization in the imaging device 20. Therefore, it is possible to improve the correction accuracy of the electronic image stabilization by utilizing the technique of the optical image stabilization.

Third Embodiment

Figure 7:
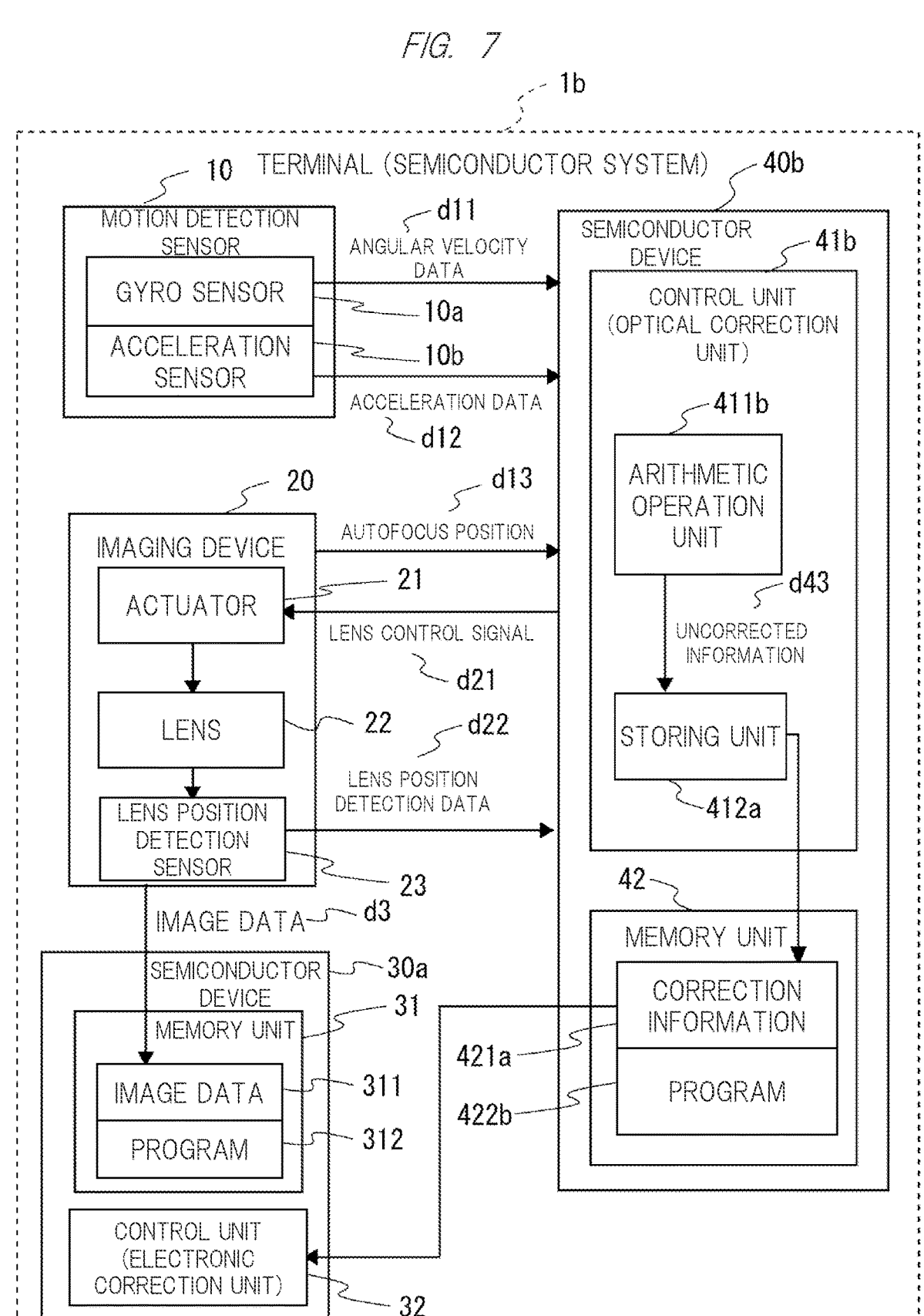
FIG. 7 is a block diagram showing a configuration of a terminal in which a semiconductor device according to the third embodiment is mounted.

The third embodiment is a modification of the second embodiment described above. FIG. 7 is a block diagram showing a configuration of a terminal 1*b* in which a semiconductor device 40*b* according to the third embodiment is mounted. The terminal 1*b* is a modification of the terminal 1*a* described above and is an example of a semiconductor system. The terminal 1*b* includes at least the motion detection sensor 10, the imaging device 20, and the semiconductor devices 30*a* and 40*b*. The motion detection sensor 10 includes an acceleration sensor 10*b* in addition to the gyro sensor 10*a* described above. The acceleration sensor 10*b* detects the tilt of the imaging device 20, measures the acceleration, and outputs it as acceleration data d12 to the semiconductor device 40*b*.

Also, the imaging device 20 outputs an autofocus position d13 to the semiconductor device 40*b*. Note that the semiconductor device 40*b* may acquire the autofocus position d13 from the configuration other than the imaging device 20. Other than that, the imaging device 20 and the semiconductor device 30*a* are the same as those of the second embodiment described above.

The semiconductor device 40*b* is a modification of the semiconductor device 40*a* described above, and is an example of a configuration that implements the function of the OIS. The semiconductor device 40*b* includes at least a control unit (optical correction unit) 41*b* and the memory unit 42. The memory unit 42 stores the correction information 421*a* and a program 422*b*. The program 422*b* is a computer program that implements the processing of the correction support method according to the present embodiment.

The control unit 41*b* implements the functions of an arithmetic operation unit 411*b*, the storing unit 412*a*, and the like by executing the program 422*b*. The arithmetic operation unit 411*b* performs predetermined arithmetic processing on the angular velocity data d11, the acceleration data d12, the autofocus position d13, and the lens position detection data d22. The arithmetic operation unit 411*b* differs from the arithmetic operation unit 411*a* in the method of calculating the lens position information d42. Namely, the arithmetic operation unit 411*b* acquires the angular velocity data d11 and the acceleration data d12 detected by the motion detection sensor 10 as detection data. Then, the arithmetic operation unit 411*b* converts the angular velocity data d11 into first angle data d44. Further, the arithmetic operation unit 411*b* converts second angle data d45 converted from the acceleration data d12 into third angle data d46 based on distance data (autofocus position d13) based on the autofocus result of the imaging device 20. Then, the arithmetic operation unit 411*b* calculates the position information (lens target position information d41) of the lens 22 based on the first angle data d44 and the third angle data d46.

Figure 8:
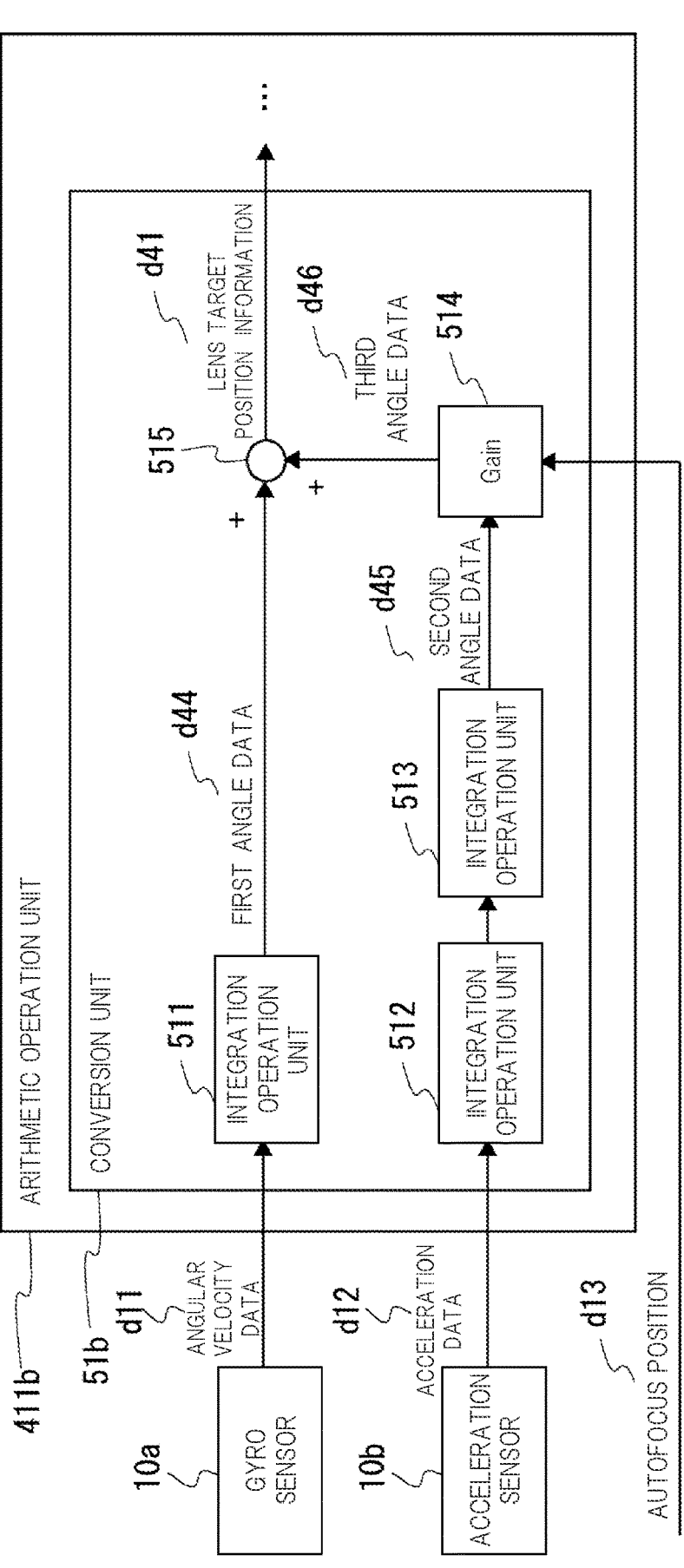
FIG. 8 is a block diagram for describing the relationship between an internal configuration and a peripheral configuration of a conversion unit in an arithmetic operation unit according to the third embodiment.

FIG. 8 is a block diagram for describing a relationship between an internal configuration and a peripheral configuration of a conversion unit 51*b* in the arithmetic operation unit 411*b* according to the third embodiment. The conversion unit 51*b* includes integration operation units 511, 512, and 513, a gain 514, and an addition unit 515. The configuration of the arithmetic operation unit 411*b* other than the conversion unit 51*b* is the same as that of the arithmetic operation unit 411*a* described above.

The integration operation unit 511 acquires the angular velocity data d11 from the gyro sensor 10*a*, performs an integration operation, and outputs the first angle data d44 to the addition unit 515. The integration operation unit 512 acquires the acceleration data d12 from the acceleration sensor 10*b*, performs integration operation, and outputs the result to the integration operation unit 513. The integration operation unit 513 performs integration operation on the integration operation result of the integration operation unit 512 and outputs the second angle data d45 to the gain 514. The gain 514 amplifies the second angle data d45 based on the autofocus position d13 and outputs the third angle data d46 to the addition unit 515. The addition unit 515 adds the first angle data d44 and the third angle data d46, and outputs the result to the servo control unit 53 and the correction error calculation unit 54 as the lens target position information d41. The subsequent process is the same as that of the second embodiment described above.

As described above, the third embodiment can also achieve the same effect as that of the second embodiment described above. Moreover, since the acceleration data and the autofocus position are used in addition to the angular velocity data for calculating the lens target position information in the third embodiment, it is possible to further improve the correction accuracy in the EIS.

In the foregoing, the invention made by the inventors of this application has been specifically described based on the embodiments, but it goes without saying that the present invention is not limited to the embodiments described above and various modifications can be made within the range not departing from the gist thereof.

What is claimed is:

1. A semiconductor device mounted in a terminal provided with an imaging device, an electronic correction unit configured to electronically correct a blur during shooting by using image data captured by the imaging device, a motion detection sensor, and a memory unit, the semiconductor device comprising:

an arithmetic operation unit configured to perform predetermined arithmetic processing on detection data acquired from the motion detection sensor; and a storing unit configured to store a result of the arithmetic processing as correction information for the correction by the electronic correction unit in the memory unit, wherein the arithmetic operation unit performs a processing of calculating uncorrected information indicating information in which the blur has not been optically corrected completely based on the detection data, as the arithmetic processing, wherein the storing unit stores the correction information including the uncorrected information in the memory unit, and wherein the arithmetic operation unit calculates a difference between lens position information of the imaging device converted from the detection data and optically corrected information in which the lens position has been optically corrected based on the position information, as the uncorrected information.

2. The semiconductor device according to claim 1, wherein the arithmetic operation unit acquires angular velocity data and acceleration data detected by the motion detection sensor as the detection data, converts the angular velocity data into a first angle data, converts second angle data converted from the acceleration data into third angle data based on distance data based on an autofocus result of the imaging device, and calculates the lens position information based on the first
angle data and the third angle data.

3. The semiconductor device according to claim 1,
wherein the arithmetic operation unit performs the arith-
metic processing by adjusting the detection data based
on at least one of states of the imaging device and the
motion detection sensor.

4. The semiconductor device according to claim 1,
wherein the arithmetic operation unit performs the arith-
metic processing in parallel with optical correction
process for the blur.

5. A correction support method comprising:
performing, by an arithmetic operation unit of a semicon-
ductor device mounted in a terminal provided with an
imaging device, an electronic correction unit config-
ured to electronically correct a blur during shooting by
using image data captured by the imaging device, a
motion detection sensor, and a memory unit, predeter-
mined arithmetic processing on detection data acquired
from the motion detection sensor,
wherein the predetermined arithmetic processing per-
formed by the arithmetic operation unit includes i)
calculating uncorrected information indicating infor-
mation in which the blur has not been optically cor-
rected completely based on the detection data, as the
arithmetic processing, and ii) calculating a difference
between lens position information of the imaging
device converted from the detection data and optically
corrected information in which the lens position has
been optically corrected based on the position infor-
mation, as the uncorrected information; and storing, by a storing unit of the semiconductor device,
correction information including the uncorrected infor-
mation in the memory unit as correction information
for use by the electronic correction unit.

6. A semiconductor system comprising:
an imaging device;
an electronic correction unit configured to electronically
correct a blur during shooting by using image data
captured by the imaging device;
a motion detection sensor;
a memory unit; and
an optical correction unit configured to optically correct
the blur by using detection data acquired from the
motion detection sensor,
wherein the optical correction unit includes:
an arithmetic operation unit configured to perform
predetermined arithmetic processing on the detection
data, wherein the arithmetic operation unit i) per-
forms a processing of calculating uncorrected infor-
mation indicating information in which the blur has
not been optically corrected completely based on the
detection data and ii) calculates a difference between
lens position information of the imaging device
converted from the detection data and optically cor-
rected information in which the lens position has
been optically corrected based on the position infor-
mation, as the uncorrected information; and
a storing unit configured to store correction information
including the uncorrected information in the memory
unit as the correction information for use by the
electronic correction unit.

\* \* \* \* \*